Oct. 9, 1923.　　　　　　　　　　　　　　　　　　1,470,308
L. W. V. WILMS
SHIFTABLE CLOSING MEANS FOR AUTOMOBILES
Filed Oct. 2, 1922　　　3 Sheets-Sheet 1
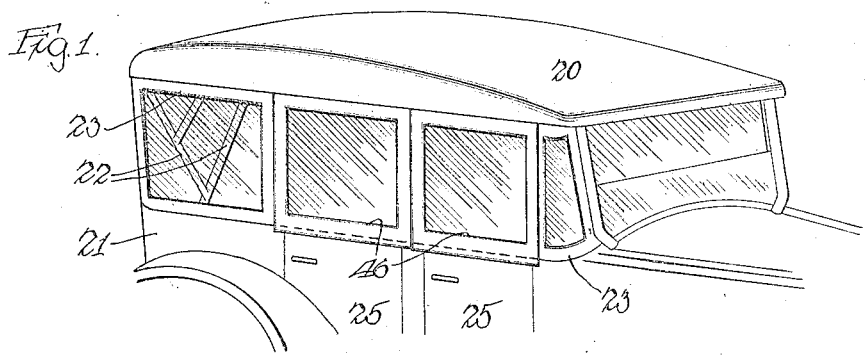
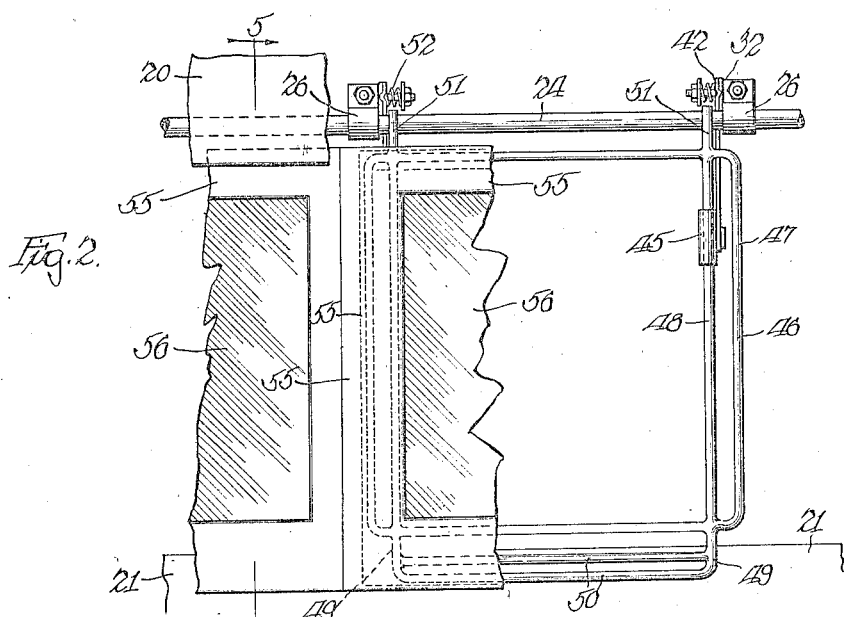
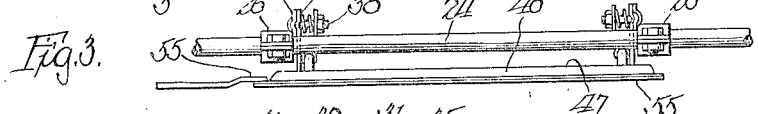
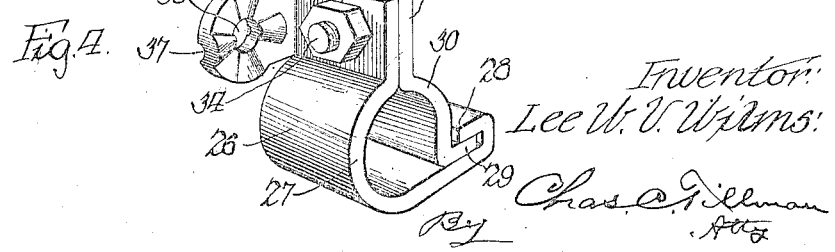
Inventor:
Lee W. V. Wilms
By Chas. C. Tillman
Atty Oct. 9, 1923.                                                       1,470,308
                            L. W. V. WILMS
                  SHIFTABLE CLOSING MEANS FOR AUTOMOBILES
                        Filed Oct. 2, 1922            3 Sheets-Sheet 2
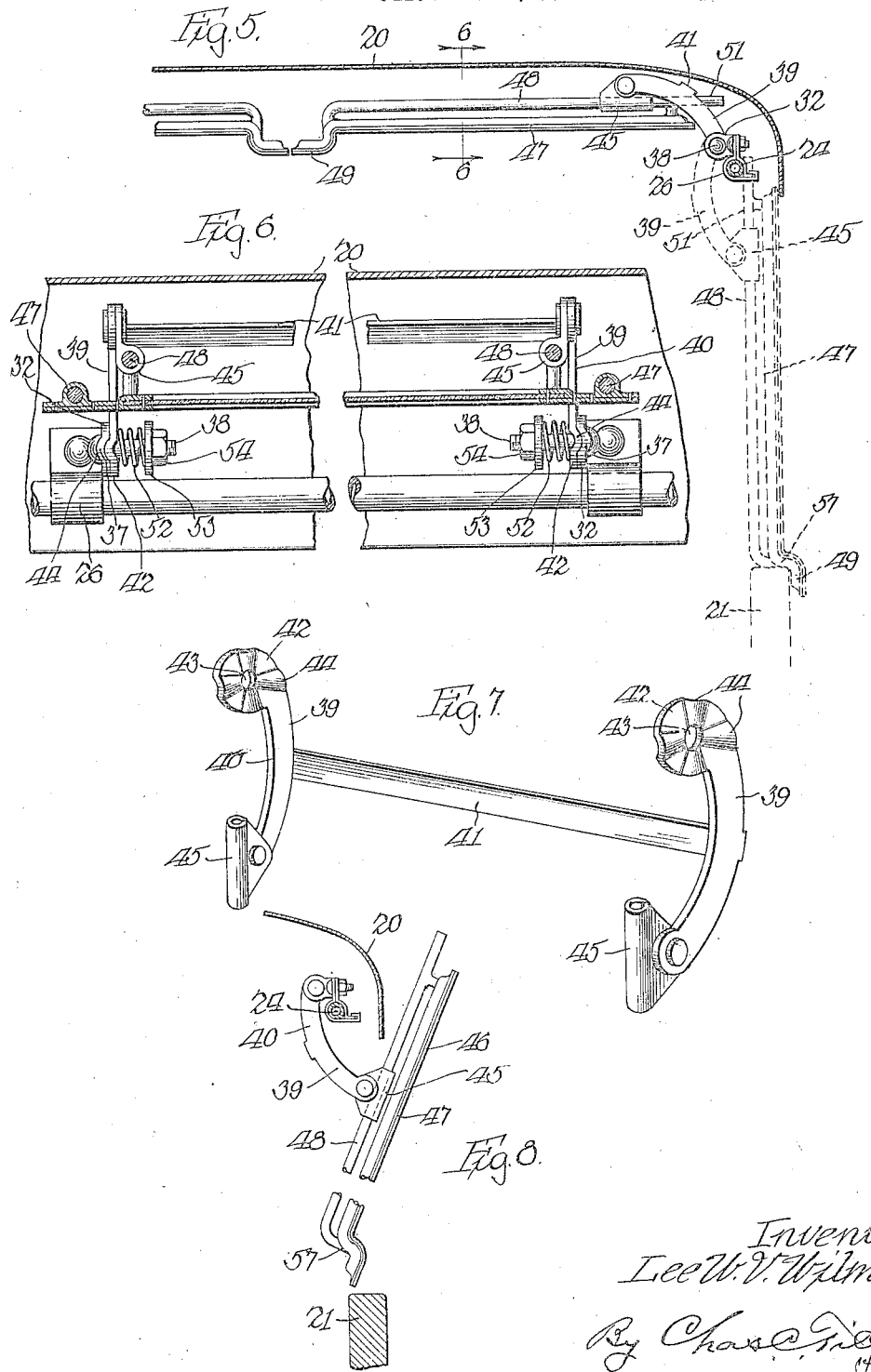
Inventor:
Lee W. V. Wilms
By Chas. C. Gillman
Atty.

Oct. 9, 1923.  1,470,308
L. W. V. WILMS
SHIFTABLE CLOSING MEANS FOR AUTOMOBILES
Filed Oct. 2, 1922  3 Sheets-Sheet 3
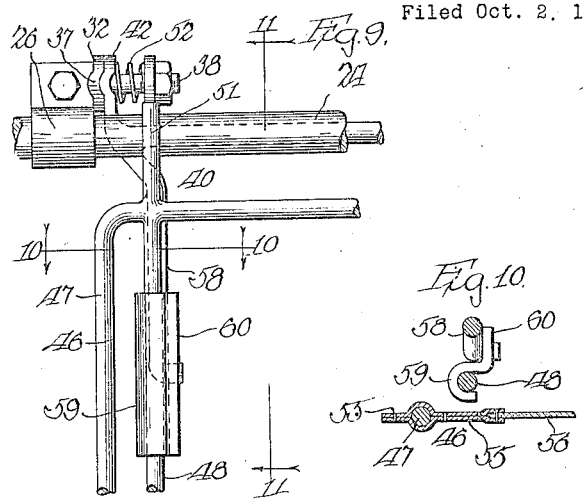
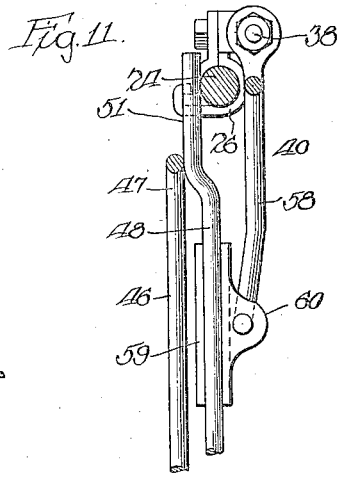
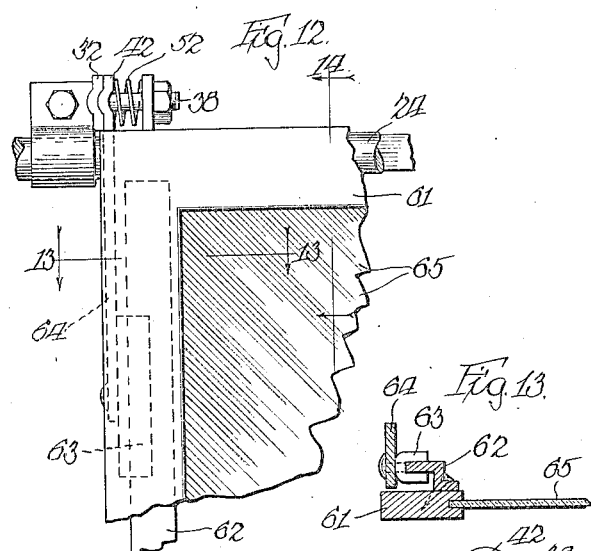
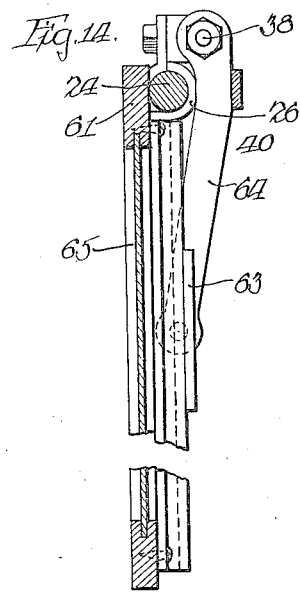
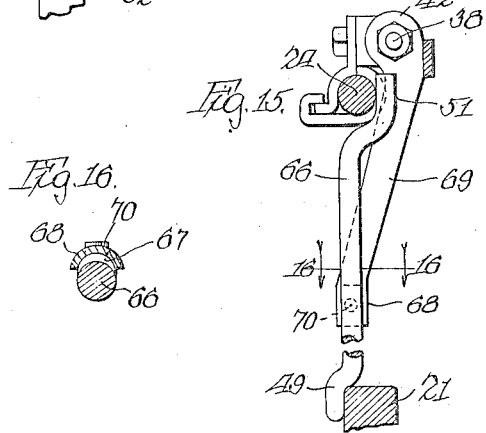
Inventor:
Lee W. V. Wilms
By Chas. C. Tillman
Atty.

Patented Oct. 9, 1923.

1,470,308

UNITED STATES PATENT OFFICE.

LEE W. V. WILMS, OF CHICAGO, ILLINOIS.

SHIFTABLE CLOSING MEANS FOR AUTOMOBILES.

Application filed October 2, 1922. Serial No. 591,748.

*To all whom it may concern:*

Be it known that I, LEE W. V. WILMS, a citizen of the United States, residing at Chicago, in the county of Cook and State of Illinois, have invented certain new and useful Improvements in Shiftable Closing Means for Automobiles, of which the following is a specification.

This invention relates generally to automobiles, but has particular relation to means or mechanism whereby the walls of a vehicle top, such as that of an automobile, may be readily and effectively closed against the elements, or easily opened to afford unobstructed vision, ventilation and comfort to the occupants of the vehicle.

While the invention is applicable to various types of vehicle or automobile tops, and while I have shown it in the accompanying drawings and will hereinafter describe it in connection with a canopy top, or the top of an automobile of the type known in the trade as tourist, yet I desire it to be understood that such illustration and description is used by way of an example only, and that I do not limit myself in the application or use of the invention to any particular type of vehicle or top therefor, but may employ it wherever it may be found applicable or desirable.

The invention consists in certain peculiarities of the construction, novel arrangement and combination of the various parts thereof as will be hereinafter more fully set forth and specifically claimed, it being obvious that changes and modifications may be resorted to without departing from the spirit of the invention, so long as they come within the scope of the claims.

The principal and broadly speaking, object of the invention, is, to provide means for converting an open top of an automobile into a closed body, or vice versa.

Another object is to provide a vehicle top with shiftable closing panels or frames for the walls of the body of the vehicle and so movably mount them that they can be positioned vertically and so maintained to form closures, or can be manipulated, raised and positioned close to the lower surface of the top or canopy, where they will be automatically locked, yet in such a way that they can be readily shifted to their upright or closing position.

Still another object is the provision of means whereby the shifting of the closure panels or sashes can be effected while the vehicle is occupied and without material interference with the occupants.

Other objects and advantages of the invention will be disclosed in the following description and explanation.

In the accompanying drawings,—

Figure 1 is a perspective view of a portion of an automobile top equipped with my shiftable closing means therefor showing the panels or sashes of said means in their upright or closed positions.

Fig. 2 is a view in side elevation of fragments of a pair of the panels or sashes used on one side of the vehicle top, a part of said top and a portion of the body of the vehicle showing the panels or sashes in the positions they will occupy to form closures for the vehicle top.

Fig. 3 is a plan view of one of the panels or sashes and a part of the adjoining sash or panel, showing the means for mounting the panel.

Fig. 4 is a detached perspective view of one of the clamps used for supporting the panels on a suitable horizontal rod carried by the canopy or top of the vehicle.

Fig. 5 is a sectional view partly in elevation taken on line 5—5 of Fig. 2, looking in the direction indicated by the arrows, illustrating by dotted lines the upright positions the panels or sashes will occupy when they are used for closing the vehicle body, and by continuous lines in about the positions they will occupy directly under the canopy when the top is converted into an open one.

Fig. 6 is an enlarged sectional view taken on line 6—6 of Fig. 5 looking in the direction indicated by the arrows.

Fig. 7 is a detached perspective view of one of the supporting brackets for the panels or sashes.

Fig. 8 is a view of a portion of the canopy of the vehicle and a part of the body thereof showing one of the panels or sashes in one of the initial positions it will occupy in being manipulated and raised to an out-ofthe-way position directly under the canopy.

Fig. 9 is a view in side elevation of a portion of one of the panels or sashes, and a part of its mount showing a slight modification in the construction employed for slidably mounting the panel or sash on its supporting bracket.

Fig. 10 is a plan sectional view taken on line 10—10 of Fig. 9.

Fig. 11 is a vertical sectional view taken on line 11—11 of Fig. 9.

Fig. 12 is a view similar to Fig. 9 showing a modification in the construction of the frame and panel, as well as in the means for slidably connecting the frame to its supporting bracket.

Fig. 13 is a plan sectional view taken on line 13—13 of Fig. 12.

Fig. 14 is a vertical sectional view taken on line 14—14 of Fig. 12.

Fig. 15 is a vertical sectional view of a portion of the body of the vehicle, a part of the horizontal support carried by the vehicle top showing another modification in the manner of supporting one of the panels or sashes on its supporting bracket, the said panel or sash being shortened for the convenience of illustration, and Fig. 16 is a plan sectional view taken on line 16—16 of Fig. 15.

Corresponding characters of reference refer to like parts throughout the different views of the drawings.

Referring now more particularly to Figs. 1 to 8 inclusive of the drawings, the reference numeral 20 designates the canopy or top of a vehicle or automobile, which may be supported on the body 21 by upright braces 22 at the rear portion of the sides thereof and at the front portion of the body in the usual or well known manner.

The front and rear side portions of the spaces between the canopy 20 and the upper part of the body 21, is shown in Fig. 1 of the drawings as being closed by curtains 23 which may be attached to the vehicle in the ordinary or well known way. When such portions are closed as stated, the spaces between the curtains 23 at the front of the body and the curtains 23 at the rear ends of the sides of the body, are adapted for closure by means of my improved device.

The frame which supports the canopy 20 is provided on each of its sides within the canopy with a longitudinally extended and horizontally disposed rod 24, which rods may be a part of the supporting frame for the canopy or separate members suitably supported alongside the side rails of the canopy-supporting frame. Mounted on each of the rods 24 above each of the doors 25 of the vehicle body are a pair of clamps or clips designated as a whole in Fig. 4 by the numeral 26, each of which consists of a transversely curved member 27 having at one of its ends an in-turned spaced lip 28 to engage a flange 29 on the corresponding end of the other transversely curved member 30 of the clip. The member 27 has at its end opposite the lip 28 a vertically disposed orificed extension 31, which extension has at one of its ends a bearing bracket 32 which is disposed at a right angle to the extension 31 and is located at and above one end of the tubular portion of the clip or clamp 26 formed by the curved portions of the parts 27 and 30. The curved member 30 is provided with an orificed extension 33 on its end opposite its flange 29 and said extension is secured against the extension 31 of the member 27 by means of a bolt 34 extended through the openings in said extensions and a nut 35 engaging said bolt.

By this arrangement it is apparent that the clips 26 can be readily and securely mounted on the rod 24 at suitable distances apart in pairs and directly above each of the doors 25 of the vehicle body. Each of the bearing brackets 32 of each of the clips is provided with a transverse opening 36 and radially around said opening with grooves 37 for co-operation with radial ribs on the arms of a supporting bracket for the sash or panel frame, as will be presently explained.

It will be observed in various views of the drawings, especially in Figs. 4, 6 and 9, that the grooves 37 of the bearing brackets 32 are located on the adjacent faces of said brackets, that is, on the face of the bracket opposite the clips. Extended through the opening 36 of each of the bearing brackets 32 is a screw-threaded bolt 38 which supports the arms 39 of the sash or panel supporting bracket, which bracket is designated as a whole by the numeral 40 and as is clearly shown in Figs. 6 and 7, comprises a pair of spaced parallel arms 39 which are preferably segmental in shape as shown in Fig. 7, and a tie bar 41 which unites the arms 39 near their middle portions. Each of the arms 39 has at one of its ends a bearing bracket 42 which is provided with a transverse opening 43 for the reception of the bolts 38 carried by the bearing brackets 32 of the clips. Each of the brackets 42 is provided on its outer surface with radial ribs 44 which co-act with the grooves 37 of the brackets 32 of the clips so as to hold the supporting bracket 40 and the panel or sash carried thereby in different positions with respect to the axis of the said supporting bracket. The opposite or lower end of each of the arms 39 has pivotally mounted thereon a tubular sleeve 45 for slidable engagement with members of the sash or panel frame.

Each of the frames of each of the panels or sashes is designated as a whole by the numeral 46, see Fig. 2, and each frame in the present instance is by preference made of strong wire and substantially rectangular in shape. The main portion or body 47 of each frame 46 is provided near each of its sides with a rod or member 48 located parallel with and at a short distance inwardly from said sides. Each of the rods 48 is offset from the plane of the body 47 so that when the panels are in the positions shown in Fig. 2, said rods will occupy a plane inwardly of the plane occupied by the body 47 of the frame. The rods 48 are extended at their upper ends outwardly or beyond the upper or horizontal portion of the body 47, when the frame is in its vertical position, and said rods are similarly extended outwardly or beyond the lower horizontal portion of the body 47 when in its vertical position as is shown in Figs. 2 and 5 of the drawings. The lower extensions 49 of the rods 48 are transversely connected by rods 50, see Fig. 2, and these extensions 49 are formed to lie in a plane outwardly of the plane occupied by the body 47 while the extensions 51 are located in a plane with the rods 48. The sleeves 45 carried by the arms 39 of the supporting bracket 40 for the sash or panel, are slidably fitted on the rods 48 so that when the arms 39 of said bracket are mounted on the bolts 38, said bracket will support the sash or panel frame 46 in such a manner that said frame can be slid through the sleeves 45 of the bracket.

In order to cause the ribs 44 on the bearing brackets 42 to operatively engage the grooves 37 on the bearing brackets 32, a coil spring 52 is placed on each of the bolts 38 so as to rest at one of its ends against the inner face of the bearing bracket 42 and at its other end against a washer 53 carried by the bolt 38 and held in place by a nut 54. By this arrangement it is evident that by turning the nut on each of the bolts 38 in the proper direction, the tension of the spring 52 may be regulated so as to press the bearing brackets 42 against the bearing brackets 32 with sufficient force to cause the ribs 44 to engage the grooves 37 so as to hold the supporting bracket 40 in different positions to which it may be turned.

Each of the frames 46 has suitably mounted on its outer surface a sheet of leatherette 55 or similar material, which is provided with a transparent panel 56 of mica or other suitable material which is not easily broken. The sheet or covering 55 on the face of each frame 46 is extended beyond the perimeter of said frame as will be readily understood by reference to Fig. 2 so that the adjacent portions of the sheets or coverings will overlap one another as shown in Fig. 3 of the drawings.

By outwardly and downwardly deflecting the lower extensions 49 of each frame 46, it is manifest that a substantially horizontal portion 57 will be provided to rest on the upper edge of the door or body of the vehicle, as is clearly shown in Figs. 5 and 8 of the drawings, when the sashes or panels are placed in their vertical or closed positions. The extensions 51 on the upper portion of each of the panel frames 46 extend between the downwardly extended sides of the canopy and the supporting rod 24 of the frame of said canopy when the sashes are in their closed or vertical positions, but when said sashes are turned to the positions indicated by continuous lines in Fig. 5, said extensions will occupy positions against the lower surface of the brace or tie-member 41 of the supporting bracket or in close proximity thereto. In Figs. 9 to 11 inclusive of the drawings is shown a modification in the construction of the means for slidably supporting the sash or panel frames, which consists in employing a supporting bracket 40 of substantially the same construction as that above described and shown in Fig. 7 of the drawings, except that the arms 58 of this modified form of the supporting bracket are made in the form of rods instead of in the form of bars, as in the other construction, and except that instead of using substantially tubular sleeves 45 for sliding engagement with the rods 48 of the panel frame, a substantially U-shaped cross-sectional member 59 having a laterally extended lug 60 pivotally secured to the lower end of each arm 58 is employed to engage the rods 48 of the frame 46 so that said frame may be slidingly held by the members 59, and if desired, detached therefrom by springing the arms 58 of the modified form of the supporting bracket outwardly.

In Figs. 12 to 14 inclusive is shown another modification in the construction of the supporting bracket for the panel frame and also in the construction of the panel frame itself. In this modification the panel frame 61 is made of flat material and rectangular in shape and has secured to its inner surface on each of its vertical sides an angle bar 62 for co-operation with a cross-sectionally U-shaped shoe 63 mounted on the lower end of each of the arms 64 of the supporting bracket constructed according to the present modification. These arms 64 are equipped at their upper ends with bearing brackets of a construction similar to that shown in Fig. 7 and above described, and also shown in Fig. 9 for co-operation with the bearing brackets 32 on the clips 26 mounted on the supporting rods therefor, which rods are carried by the frame of the canopy, as before explained. The modified panel frame 61 may be equipped with a pane of glass 65 or other suitable transparent material. Each of the shoes 63 is pivotally secured to the lower end of one of the arms 64 in such a way that the angle bar 62 will be engaged by said shoes to permit slidable movement of the frame 61 with respect to said shoes and the arms 64 of the supporting bracket for said frame.

In Figs. 15 and 16, is shown still another modification in the construction of the supporting bracket for the panel frame, and also in the construction of the frame itself. In the present modification the panel frame 66 is rectangular in shape, as in the other constructions, and is by preference made of strong wire or rod material, and has at its upper end the extensions 51 and at its lower end the offset extensions 49 common to all of the constructions of the panel frames. The frame 66 may be equipped on its outer surface with leather or other flexible material having a transparent window as shown in Fig. 2 and above described, but in the Figure 15, this element has been omitted for the clearness of illustration.

Each of the side rails of the panel frame 66 is provided at a suitable point between its ends, and in a plane with the frame, with a rounded boss or enlargement 67, with which a shoe 68 carried on the lower end of each of the arms 69 of the frame supporting bracket constructed according to the present modification, engage. As shown in Fig. 16, each of the shoes 68 is segmental in cross-section and pivoted to the side rails of the panel frame. By this arrangement it is manifest that by turning the frame 66 on the pivots 70, the frame 66 can be positioned as desired for placing it in the out-of-the-way position under the canopy as shown in Fig. 5 of the drawings. The rounded bosses 67 will co-act with the curved shoes 68 in such a manner as to cause the side rails of the frame to be sprung inwardly a sufficient distance to permit of the pivotal movement of the panel frame. The arms 69 of the supporting bracket are equipped at their upper ends with bearing brackets 42 of a construction similar to that shown in Fig. 7 and above described, for co-operation with the bearing brackets 32 on the clips 26 mounted on the supporting rods therefor.

From the foregoing and by reference to the drawings, it will be readily understood and clearly seen that in each of the constructions illustrated and above described, with the exception of the modification shown in Figs. 15 and 16, the panel or sash frames, when positioned for closing the walls of the vehicle as shown by continuous lines in Figs. 1 and 2 and by dotted lines in Fig. 5, will rest at their lower ends on the upper edge of the body 21 or doors thereof, and that the vertical extensions on the upper ends of said frames will be positioned outwardly of the horizontal supporting rods 24 for the panel supporting brackets. Now, when it is desired to convert the vehicle into an open one or to raise one of the panel or sash frames, all that is necessary is to lift the frame vertically until the offset portion 57 at the lower end thereof is in position for tiltable movement on the supporting arms of the bracket for said frame, without interfering with the upper edge of the body 21 of the vehicle, as is clearly shown in Fig. 8 of the drawings.

When in this position, a further upward and outward movement of the panel frame and the supporting bracket therefor can be effected, and the panel frame can then be slid on the slidable members of the arms of the supporting bracket to the proper position, so that the panel frame and the supporting bracket therefor can be positioned about horizontally under the canopy 20 as shown in Fig. 5 and retained in such position by reason of the locking engagement of the bearing brackets on the upper ends of the arms of the supporting brackets with the bearing brackets of the clips on the supporting rod. If desired, further means for assisting in holding the frame in its horizontal position may be mounted on and carried by the canopy or its frame, as is obvious.

By the construction of the bearing brackets 32 and 42 of the clips and frame supporting brackets respectively, it is manifest that the arms of the supporting brackets can be turned to almost any angle and will be held in such positions against accidental dislocation. As the panel frames are adjustable on their supporting brackets, and as said brackets are adjustable laterally with respect to their supporting rods, it is manifest that the panel frames can be manipulated in such a way as to be mainly performed outside of the vehicle body so that when it is desirable to place the frames in their inoperative positions under the canopy, their movements will not materially interfere with the occupants of the vehicle.

The operation of the modified construction shown in Fig. 15, is as follows:

The sash frame 66 and the supporting bracket 69 are moved outwardly of the body 21, when by tilting the frame 66 on its pivot, the bracket supporting arms 69 can be turned inwardly of the body of the vehicle and to a horizontal position under the canopy thereof, thus causing the frame 66 to assume and occupy a similar position.

Having thus fully described my invention, what I claim as new and desire to secure by Letters Patent is—

1. In a vehicle body and top therefor having a wall provided with a shiftable panel, the combination with a pair of bearing brackets mounted in spaced relation and transversely on the said top above said panel, of a depending support comprising a pair of transversely braced parallel arms pivotally connected at their lower ends to the panel near its sides and co-operatively connected at their upper ends to said brackets for lateral pivotal movement thereon and for automatically locking them thereto in any one of the various angles to which they may be turned with respect to their pivots.

2. In a vehicle body and top therefor having a wall provided with a shiftable panel, the combination with a horizontally disposed supporting rod carried by the top along its said wall, of a pair of clips mounted in spaced relation on said rod, each of said clips carrying a transversely disposed apertured bearing bracket having radial depressions on one of its surfaces, a supporting bracket having a pair of parallel arms pivotally connected at one of their ends to the panel and each arm having at its upper end a transversely apertured bearing bracket provided with radial ribs to engage the radial depressions of the first named bearing brackets, a bearing bolt extended through the apertures of each pair of said bearing brackets, and a spring on each of said bolts for exerting pressure against the bearing brackets of said arms towards the bearing brackets of said clips.

3. In a vehicle body and top therefor having a wall provided with a shiftable panel, the combination with a horizontally disposed supporting rod carried by the top along its said wall, of a pair of clips mounted in spaced relation on said rod, each of said clips carrying a transversely disposed apertured bearing bracket having radial depressions on one of its surfaces, a supporting bracket having a pair of spaced arms pivotally and slidably connected at one of their ends to the panel near the sides thereof and between its ends, each of said arms having at its other end a transversely apertured bearing bracket provided with radial ribs to engage the radial depressions of the first named bearing brackets, bearing bolts extended through the apertures of each pair of said bearing brackets, and a spring mounted to exert its pressure against each of the bearing brackets of said arms towards the bearing brackets of said clips.

LEE W. V. WILMS.